US009130424B2

(12) United States Patent
Moon et al.

(10) Patent No.: US 9,130,424 B2
(45) Date of Patent: Sep. 8, 2015

(54) ROTOR OF INTERIOR PERMANENT MAGNET MOTOR

(71) Applicants: HYUNDAI MOTOR COMPANY, Seoul (KR); KIA MOTORS CORPORATION, Seoul (KR)

(72) Inventors: Sanghoon Moon, Seongnam-Si (KR); Hyun Su Kim, Yongin-si (KR); Kyoungbum Kim, Yongin-Si (KR); Jinhun Lee, Yongin-si (KR); Ki Nam Kim, Seongnam-si (KR); Myunggyu Kim, Seoul (KR); Hyoungjun Cho, Seoul (KR); Woong Chan Chae, Gwangmyeong-si (KR); Yeonho Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/325,158

(22) Filed: Jul. 7, 2014

(65) Prior Publication Data

US 2015/0188368 A1 Jul. 2, 2015

(30) Foreign Application Priority Data

Dec. 30, 2013 (KR) ........................ 10-2013-0167841

(51) Int. Cl.
*H02K 1/27* (2006.01)

(52) U.S. Cl.
CPC ...................................... *H02K 1/274* (2013.01)

(58) Field of Classification Search
CPC .... H02K 1/276; H02K 1/2766; H02K 1/2773
USPC ........................... 310/156.38, 156.56, 156.53
See application file for complete search history.

(56) References Cited

U.S. PATENT DOCUMENTS

| | | | | |
|---|---|---|---|---|
| 2002/0175584 A1* | 11/2002 | Koharagi et al. | ........ | 310/156.56 |
| 2008/0007131 A1* | 1/2008 | Cai et al. | .................. | 310/156.38 |
| 2010/0026128 A1* | 2/2010 | Ionel | ........................ | 310/156.53 |
| 2010/0079026 A1* | 4/2010 | Han et al. | .................. | 310/156.53 |
| 2012/0194026 A1* | 8/2012 | Matsuoka et al. | ....... | 310/156.53 |
| 2013/0154425 A1 | 6/2013 | Nakada | | |

FOREIGN PATENT DOCUMENTS

KR 10-2011-0026162 A 3/2011

* cited by examiner

*Primary Examiner* — Naishadh Desai

(74) *Attorney, Agent, or Firm* — McDermott Will & Emery LLP

(57) ABSTRACT

A rotor of an interior permanent magnet motor includes a rotor core configured to form a body of the rotor. An upper permanent magnet group is configured to be inserted into the rotor core to form a magnetic pole. A lower permanent magnet group is configured to be inserted into the rotor core below the upper permanent magnet group to form a two-layered structure with the upper permanent magnet group. Each of the upper and lower permanent magnet groups may include two V-shaped permanent magnets. A polar arc angle formed by the two permanent magnets of the upper permanent magnet group may be different from a polar arc angle formed by the permanent magnets of the lower permanent magnet group.

1 Claim, 5 Drawing Sheets

FIG. 3

| Classification | | Related art | Present disclosure |
|---|---|---|---|
| Torque ripple (at middle/high rpm) | N×3 order | 3.5 % | 3.9 % |
| | N×6 order | 3.4 % | 1.0 % |

FIG. 4

| Classification | Related art | | Present disclosure | |
|---|---|---|---|---|
| | N×3 order below 4000 rpm | N×6 order above 4000 rpm | N×3 order below 4000 rpm | N×6 order above 4000 rpm |
| Interior noise | 33 dBA | 18 dBA | 34 dBA | 10 dBA |

ROTOR OF INTERIOR PERMANENT MAGNET MOTOR

CROSS-REFERENCE TO RELATED APPLICATION

This application claims the benefit of priority to Korean Patent Application No. 10-2013-0167841 filed in the Korean Intellectual Property Office on Dec. 30, 2013, the entire contents of which are incorporated herein by reference.

TECHNICAL FIELD

The present disclosure relates to a rotor of an interior permanent magnet motor, and more particularly, to a rotor of an interior permanent magnet motor that may reduce torque ripple by inserting at least two permanent magnets into the rotor to form a two-layered structure and setting polar arc angles to be different from one another.

BACKGROUND

An interior permanent magnet (IPM) motor is primarily used in green vehicles, such as, an electric vehicle and a hybrid electric vehicle, because the IPM motor may provide high efficiency, high torque, and high output density. The IPM motor is classified into a concentrated winding type IPM motor or a distributed winding type IPM motor.

Whenever the IPM motor and a general motor rotate one cycle of an electrical angle, their torque periodically varies according to a predetermined frequency. The predetermined frequency may be determined based on combination of the number of phases, poles, and slots of the motor. A ratio of a torque variation difference and a torque average is referred to as torque ripple, and is generally determined in a percentage. For example, torque ripple of the IPM motor that is driven by 3-phase power and that is made with a pole/slot number ratio of 1/6 may occur at frequency components corresponding to 3, 6, 9, . . . times the pole number (N). Frequency components corresponding to 3 and 6 times the pole number (N) among the frequency components, for example, $24^{th}$-order and $48^{th}$-order frequency components of the IPM motor made with 3 phases, 8 poles, and 48 slots, generally cause audible sound.

An IPM according to the related art causes a noise associated with frequencies corresponding to 6 times the number (N) of poles of the IPM motor when revolutions per minute (rpm) is over a middle/high speed (e.g., 4000 rpm), and it is known that the noise gets on a driver's nerves. Since the noise and/or the torque ripple noise may aggravate noise, vibration, and harshness (NVH) of the green vehicles, such as the electric vehicle and the hybrid vehicle that use a motor, the noise and/or the torque ripple are/is a considered performance factor when the motor is designed.

However, design for reducing the torque ripple may worsen total harmonic distortion (THD) that influences controllability and iron loss, and increase a maximum current for driving.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a rotor of an interior permanent magnet motor that may reduce torque ripple while maintaining performance of an interior permanent magnet motor. In other words, the present disclosure provide a rotor of an interior permanent magnet motor that may reduce torque ripple by inserting at least two permanent magnets into the rotor to form a two-layered structure and setting polar arc angles to be different from one another.

An exemplary embodiment of the present disclosure provides a rotor of interior permanent magnet (IPM) motor includes a rotor core configured to form a body of the rotor. An upper permanent magnet group is configured to be inserted into the rotor core to form a magnetic pole. A lower permanent magnet group is configured to be inserted into the rotor core below the upper permanent magnet group to form a two-layered structure with the upper permanent magnet group. Each of the upper and lower permanent magnet groups may include two V-shaped permanent magnets. A polar arc angle formed by the two permanent magnets of the upper permanent magnet group may be different from a polar arc angle formed by the permanent magnets of the lower permanent magnet group.

The rotor may further include an upper cavity at the rotor core for the two permanent magnets of the upper permanent magnet group to be inserted. A lower cavity may be at the rotor core for the two permanent magnets of the lower permanent magnet group to be inserted. The upper cavity may be a structure in which the two permanent magnets of the upper permanent magnet group are inserted together, and the lower cavity may be a structure in which the two permanent magnets of the lower permanent magnet group are inserted individually.

The polar arc angle formed by the upper permanent magnet group may include a first upper polar arc angle and a second upper polar arc angle, the first upper polar arc angle may be formed between a center of a V-shaped space and the permanent magnet inserted in the upper cavity, and the second upper polar arc angle may be formed by a space of the upper cavity that is not occupied by the permanent magnet. The polar arc angle formed by the lower permanent magnet group may include a first lower polar arc angle and a second lower polar arc angle, the first lower polar arc angle may be formed between the center of the V-shaped space and an outer end of the permanent magnet inserted in the lower cavity, and the second lower polar arc angle may be formed by a space of the lower cavity that is not occupied by the permanent magnet. The first and second upper polar arc angles and the first and second lower polar arc angles may be different from one another.

The first upper polar arc angle may be smaller than the first lower polar arc angle.

The second upper polar arc angle may be larger than the second lower polar arc angle.

The first and second upper polar arc angles may be about 14° and 2°, respectively, and the first and second lower polar arc angles may be about 19.6° and 1.85°, respectively.

According to an exemplary embodiment of the present disclosure, it is possible to significantly reduce torque ripple, for example, a torque ripple component corresponding to a [polar number (N)×6]th-order frequency while maintaining performance of an interior permanent magnet motor.

According to an exemplary embodiment of the present disclosure, it is possible to reduce torque ripple by inserting at least two permanent magnets into a rotor to form a two-layered structure and setting polar arc angles to be different from one another.

BRIEF DESCRIPTION OF THE DRAWINGS

FIG. 3 and FIG. 4 are tables for showing improvement of a rotor of an interior permanent magnet motor according to an exemplary embodiment of the present disclosure.

DETAILED DESCRIPTION OF THE EMBODIMENTS

Figure 1:
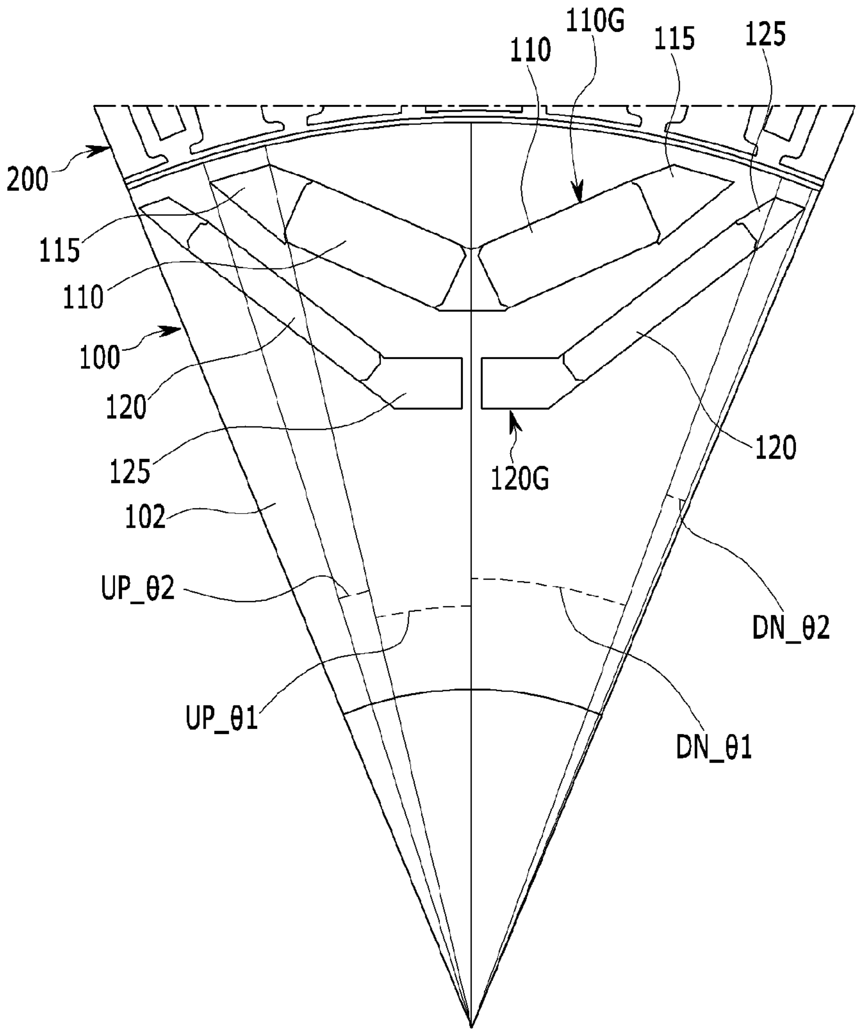
FIG. 1 is a schematic diagram of a rotor of an interior permanent magnet motor according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Unless explicitly described to the contrary, the word "comprise" and variations such as "comprises" or "comprising" will be understood to imply the inclusion of stated elements but not the exclusion of any other elements. Like reference numerals designate like elements throughout the specification. In the drawings, the size of constituent elements is exaggerated for clarity.

Figure 2:
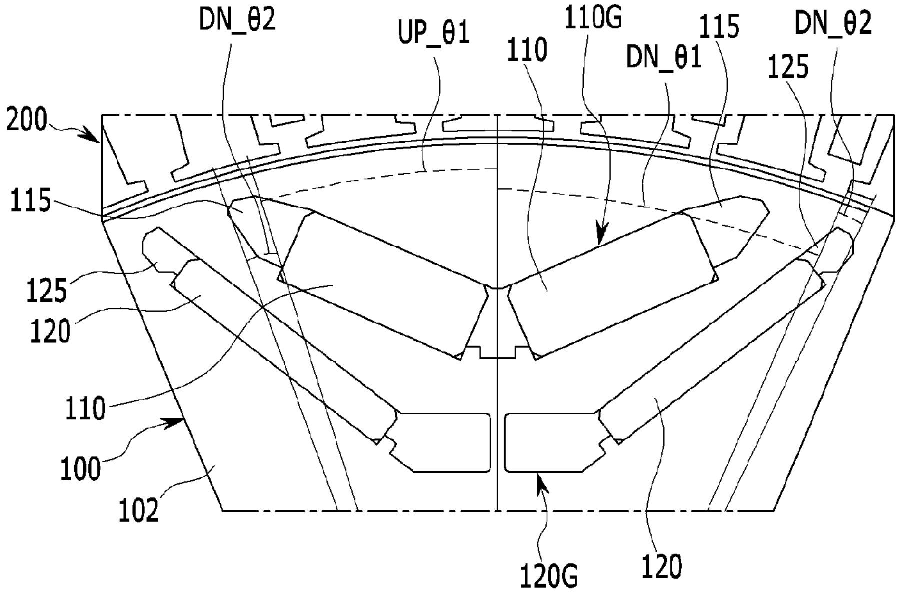
FIG. 2 is a partial enlarged schematic diagram of a rotor of an interior permanent magnet motor according to an exemplary embodiment of the present disclosure.

FIG. 1 is a schematic diagram of a rotor of an interior permanent magnet motor according to an exemplary embodiment of the present disclosure. FIG. 2 is a partial enlarged schematic diagram of a rotor of an interior permanent magnet motor according to an exemplary embodiment of the present disclosure.

A rotor of an interior permanent magnet (IPM) motor according to an exemplary embodiment of the present disclosure is one that may reduce torque ripple while maintaining performance of an interior permanent magnet motor. A rotor 100 according to an exemplary embodiment of the present disclosure may include a rotor core 102 configured to form a body of the rotor 100. An upper permanent magnet group 110G is configured to be inserted into the rotor core 102 to form a magnetic pole, and a lower permanent magnet group 120G is configured to be inserted into the rotor core 102 below the upper permanent magnet group 110G to have a two-layered structure with the upper permanent magnet group 110G. The rotor core 102 may be applied in the related art, so the detailed description thereof will be omitted here.

Each of the upper permanent magnet group 110G and the lower permanent magnet group 120G, as shown in FIGS. 1 2, includes two V-shaped permanent magnets 110 and 120. In FIGS. 1 2, reference numeral 200 refers to a stator of the IPM motor. The permanent magnet 110 and 120 may be those generally applied to the IPM motor of the related art.

Polar arc angles UP_θ1 and UP_θ2 formed by the two permanent magnets 110, and polar arc angles DN_θ1 and DN_θ2 formed by the two permanent magnets 120, which will be described later, are different from each other.

The rotor core 102 includes an upper cavity 115 in which the two permanent magnets 110 of the upper permanent magnet group 110G are inserted, and a lower cavity 125 in which the two permanent magnets 120 of the lower permanent magnet group 120G are inserted. The upper cavity 115, as shown in FIGS. 1 and 2, may have a structure in which the two permanent magnets 110 of the upper permanent magnet group 110G are inserted together. The lower cavity 125 may be a structure in which the two permanent magnets 120 of the lower permanent magnet group 120G are inserted individually. The cavities 115 and 125 are filled with a molding material to fix the permanent magnets 110 and 120 in the cavities, respectively. The molding material may be applied to the related art, thus the detailed description thereof will be omitted in the present specification.

The polar arc angles formed by the upper permanent magnet group 110G include a first upper polar arc angle UP_θ1 and a second upper polar arc angle UP_θ2. The first upper polar arc angle UP_θ1 is formed between a center of a V-shaped space and the permanent magnets 110 inserted in the upper cavity 115, and the second upper polar arc angle UP_θ2 is formed by a space of the upper cavity 115 that is not occupied by the permanent magnets 110.

The polar arc angles formed by the lower permanent magnet group 120G include a first lower polar arc angle DN_θ1 and a second lower polar arc angle DN_θ2. The first lower polar arc angle DN_θ1 is formed between the center of the V-shaped space and an outer end of the permanent magnets 120 inserted in the lower cavity 125. The second lower polar arc angle DN_θ2 is formed by a space of the lower cavity 125 that is not occupied by the permanent magnet 120. The first and second upper polar arc angles (UP_θ1, UP_θ2) and the first and second lower polar arc angles (DN_θ1, DN_θ2) are differently formed from one another to be able to reduce torque ripple, for example, a torque ripple component corresponding to an [(N)x6]th-order frequency while maintaining performance of the IPM motor. The first upper polar arc angle UP_θ1 may be smaller than the first lower polar arc angle DN_θ1, and the second upper polar arc angle UP_θ2 may be larger than the second lower polar arc angle DN_θ2.

More specifically, the first and second upper polar arc angles (UP_θ1, UP_θ2) may be about 14 degrees and 2 degrees, respectively, and the first and second lower polar arc angles (UP_θ1, UP_θ2) may be about 19.6 degrees and 1.85 degrees, respectively.

Hereinafter, the operation of the rotor of IPM motor according to an exemplary embodiment of the present disclosure will be described.

FIG. 3 is a table comparing torque ripple occurring from the IPM motor provided with the rotor according to the exemplary embodiment of the present disclosure and an IPM motor of the related art at a middle/high rpm (e.g., 4000 rpm). Referring to FIG. 3, it may be seen that a torque ripple component occurring at an [N×3]th-order is not very different between the exemplary embodiment of the present disclosure and the related art, but a torque ripple component occurring at an [N×6]th-order frequency is significantly reduced.

FIG. 4 is a table comparing noise occurring from the IPM motor provided with the rotor according to an exemplary embodiment of the present disclosure and the IPM motor of the related art. Referring to FIG. 4, it may be seen that a noise component occurring at an [N×3]th-order frequency is not very different between the exemplary embodiment of the present disclosure and the related art regardless of the rpm of the IPM motor, but a noise component occurring at an [N×6]th-order frequency is significantly reduced.

Figure 5:
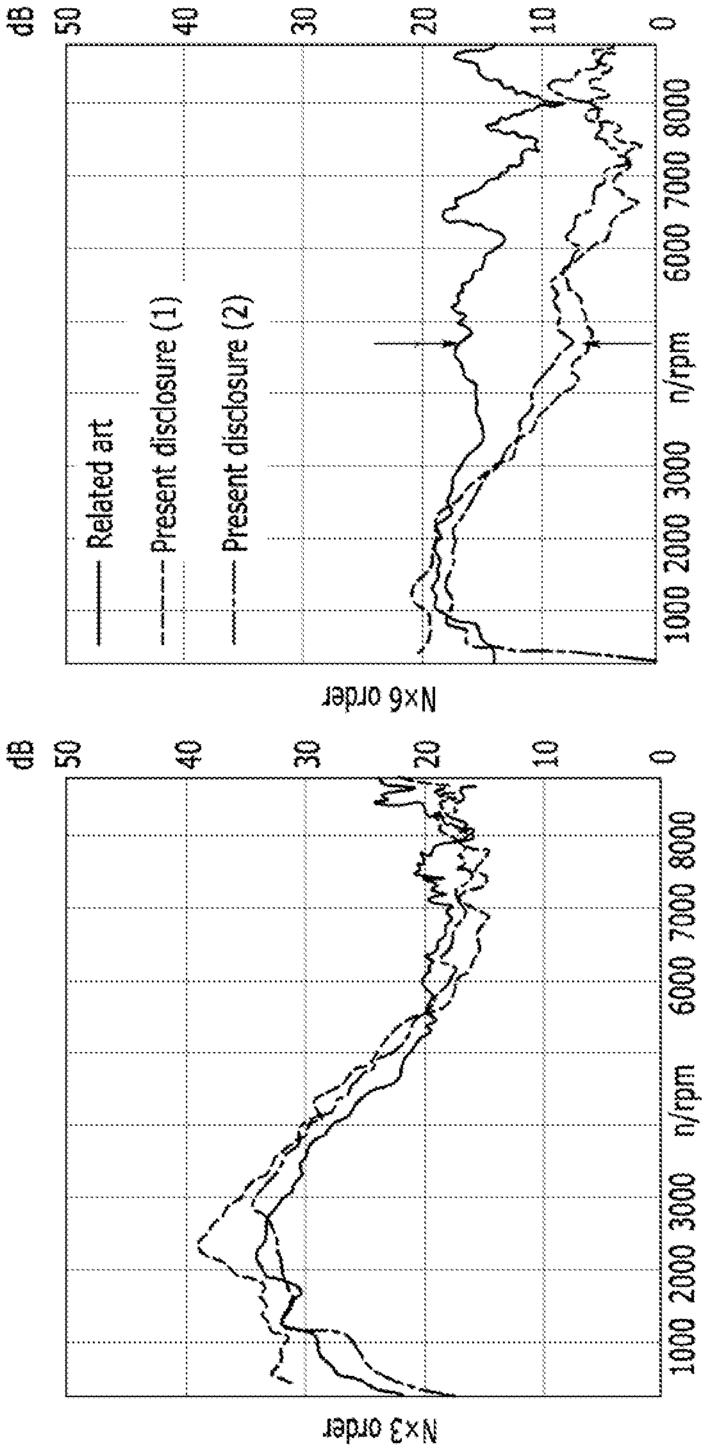
FIG. 5 shows graphs of improved performance of a rotor of an interior permanent magnet motor according to an exemplary embodiment of the present disclosure and an interior permanent magnet motor of the related art.

FIG. 5 shows graphs of a correlation between rpm and noise with respect to the IPM motor provided with the rotor according to an exemplary embodiment of the present disclosure and the IPM motor of the related art. Referring to FIG. 5, it may be seen that a noise component occurring at an [N×3]th-order frequency and at a low rpm is not very different between the exemplary embodiment of the present disclosure and the related art, but a noise component occurring at an [N×6]th-order frequency at middle/high rpm is significantly reduced.

Accordingly to an exemplary embodiment of the present disclosure, it is possible to reduce torque ripple by inserting at least two permanent magnets into a rotor to form a two-layered structure and setting polar arc angles to be different from one another.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A rotor of an interior permanent magnet (IPM) motor, comprising:

a rotor core forming a body of the rotor;

an upper permanent magnet group configured to be inserted into the tutor core to form a magnetic pole;

a lower permanent magnet group configured to be inserted into the rotor core below the upper permanent magnet group and having a two-layered structure with the upper permanent magnet group;

an upper cavity formed at the rotor core for two upper permanent magnets of the upper permanent magnet group to be inserted therein; and a lower cavity formed at the rotor core for two lower permanent magnets of the lower permanent magnet group to be inserted therein, wherein each of the upper and lower permanent magnets has V-shape, a polar are angle formed by the two upper permanent magnets of the upper permanent magnet group is different from a polar arc angle formed by the two lower permanent magnets of the lower permanent magnet group, the upper cavity is a structure into which the two upper permanent magnets of the upper permanent magnet group are inserted together, the lower cavity is a structure into which the two lower permanent magnets of the lower permanent magnet group are inserted individually, the polar arc angle formed by the upper permanent magnet group includes a first upper polar arc angle and a second upper polar arc angle, the first upper polar arc angle is formed between a center of a V-shaped space and one of the two upper permanent magnets inserted in the upper cavity, and the second upper polar are angle is formed by a space of the upper cavity that is not occupied by the upper permanent magnet, the polar arc angle formed by the lower permanent magnet group includes a first lower polar arc angle and a second lower polar arc angle, the first lower polar are angle is formed between the center of the V-shaped space and an outer end of one of the two lower permanent magnets inserted in the lower cavity, and the second lower polar arc angle is formed by a space of the lower cavity that is not occupied by the lower permanent magnet, the first and second upper polar arc angles and the first and second lower polar arc angles are different from one another, the first upper polar arc angle is smaller than the first lower polar arc angle, the second upper polar arc angle is larger than the second lower polar arc angle, and the first and second upper polar arc angles are about 14 degrees and 2 degrees, respectively, and the first and second lower polar are angles are about 19.6 degrees and 1.85 degrees, respectively.

* * * * *